July 18, 1939.  L. B. BETZ  2,166,283
REFRIGERATION
Filed Feb. 16, 1937  3 Sheets-Sheet 3
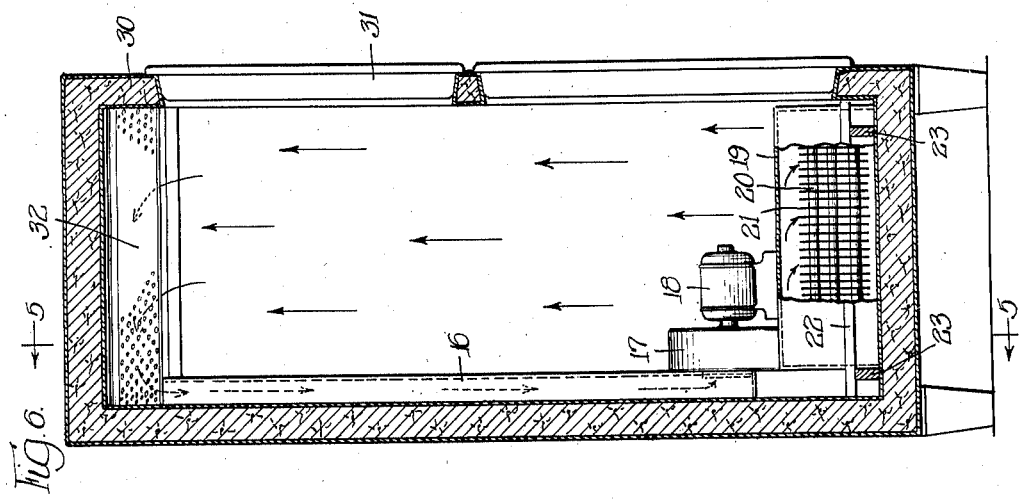
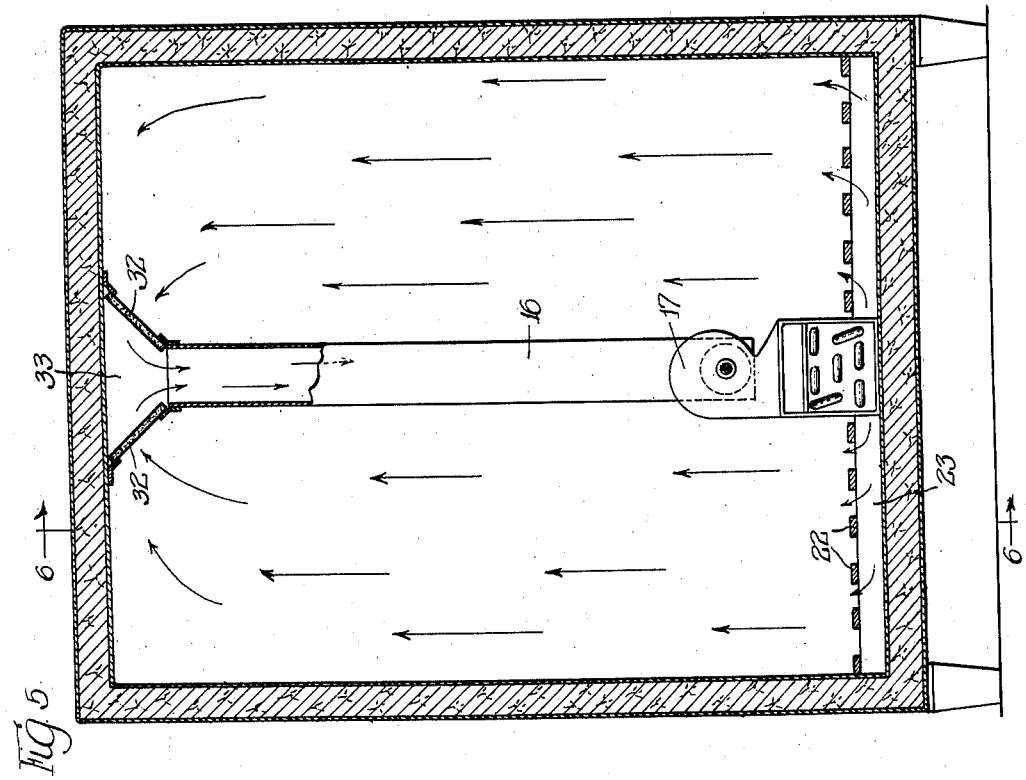
Inventor:
Lyman B. Betz,
By Cromwell, Dreist + Warden Patented July 18, 1939

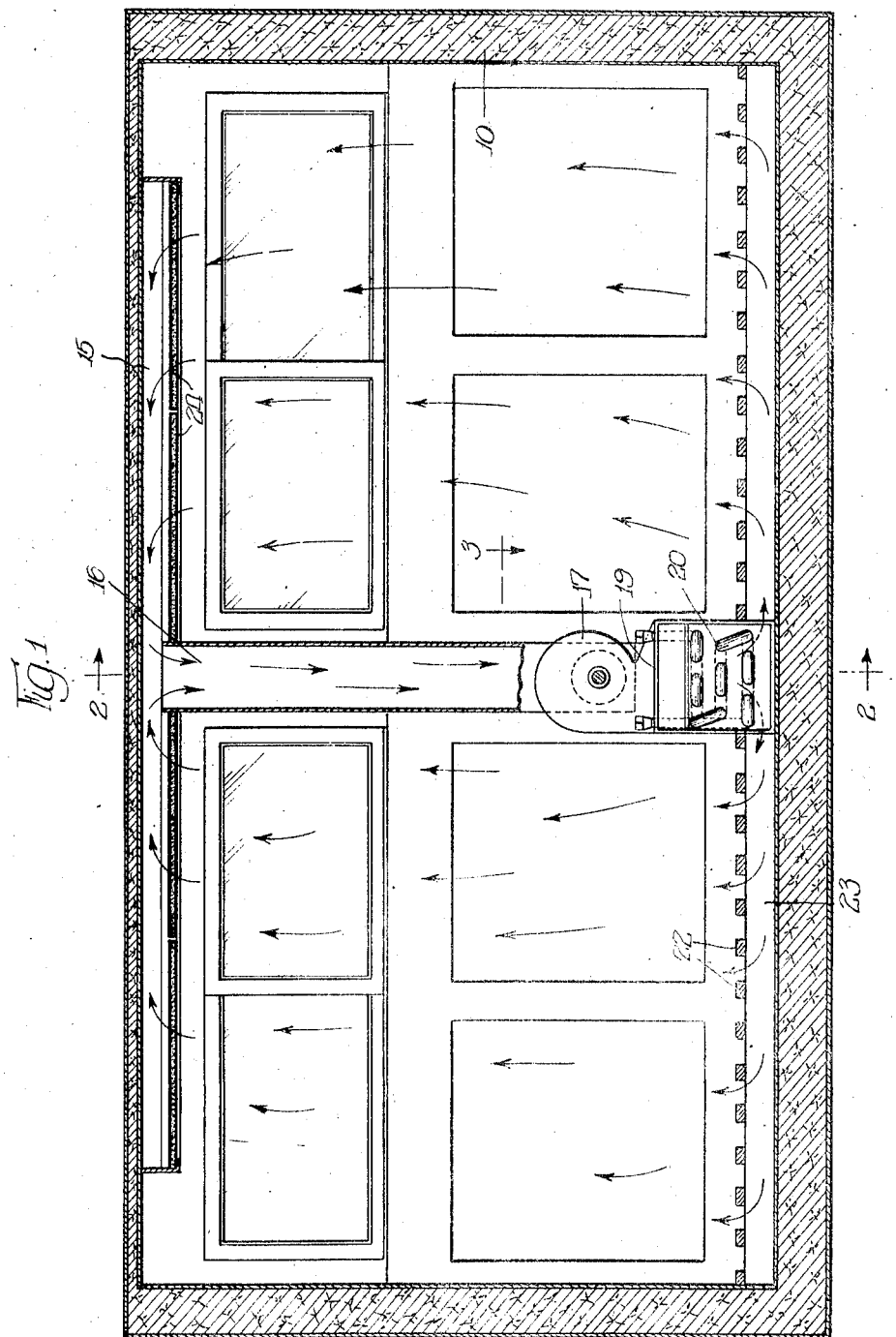

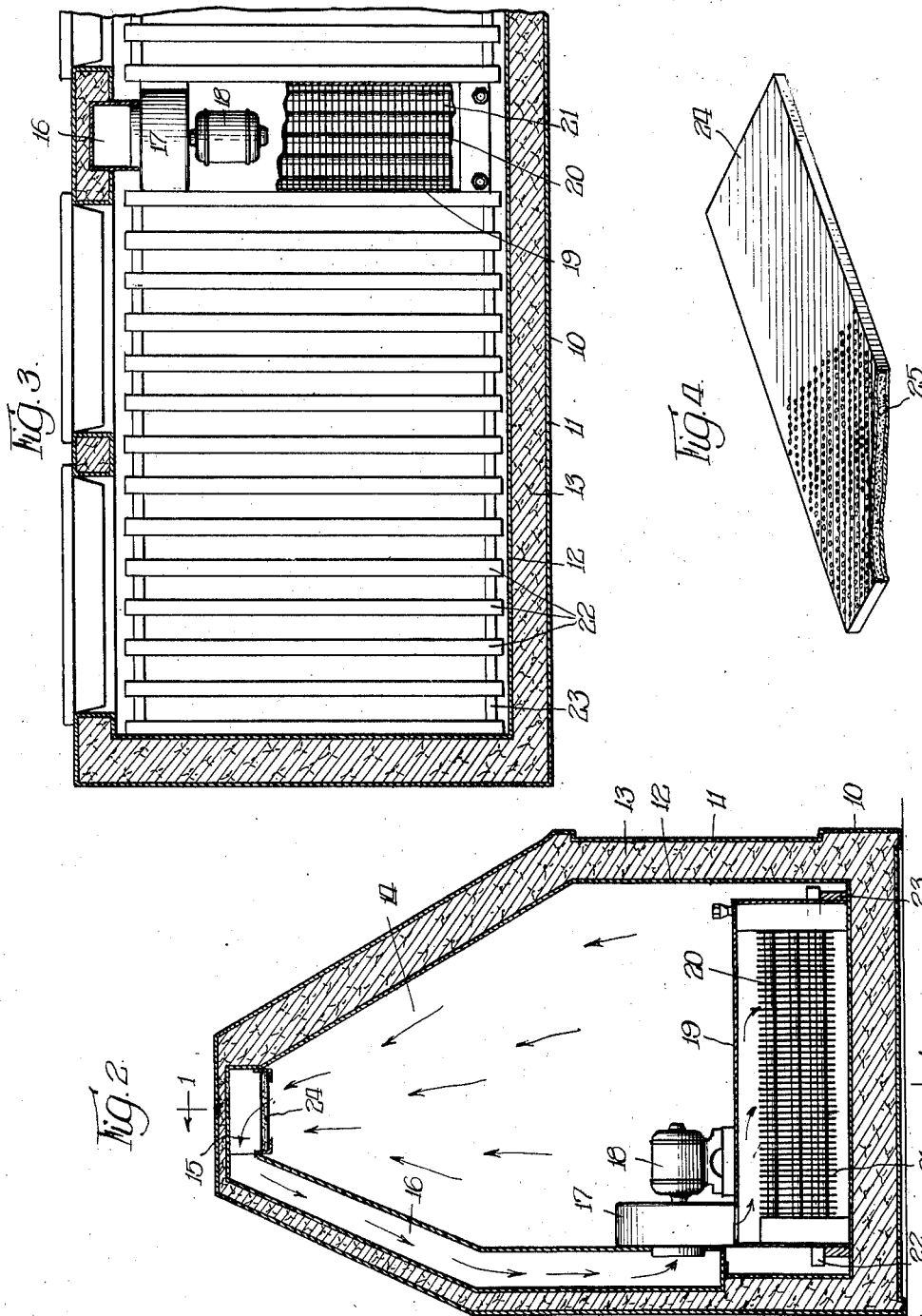

2,166,283

UNITED STATES PATENT OFFICE 2,166,283

REFRIGERATION

Lyman B. Betz, Hammond, Ind.

Application February 16, 1937, Serial No. 125,987

3 Claims. (Cl. 62—89)

The present invention relates to refrigeration and has particular reference to an improved refrigerating mechanism of the forced convection type, in which a refrigerating medium such as air is passed through a heat exchange zone and then is conditioned before being recirculated.

A principal object of the invention is the provision of a refrigeration system of the forced convection type which is particularly well adapted to the refrigeration of food products susceptible to odor and taste contamination and the deleterious effects of dehydration.

An additional object is to provide a refrigeration apparatus having a relatively large refrigerating capacity in comparison with the space occupied by the refrigeration unit.

Still another object is the provision of refrigerating apparatus operated at a temperature above that at which the water vapor contained in the circulated air will freeze and being of particular effectiveness in the preservation of a mixture of food products, at least some of which are susceptible of odor and taste contamination and dehydration, the device being simple in construction and economic in operation.

These and other objects will be evident upon a consideration of the following description of the invention and by reference to the accompanying drawings, in which Fig. 1 is a vertical sectional view of a refrigeration system constructed in accordance with my invention, the view being taken along line 1—1 of Fig. 2;

Fig. 2 is a cross-sectional view of the refrigeration device shown in Fig. 1 and is taken along line 2—2 of the latter figure;

Fig. 3 is a fragmentary horizontal sectional view taken along line 3—3 of Fig. 1;

Fig. 4 is a perspective view, partly broken away, of a purification unit;

Fig. 5 is a vertical sectional view of a modified refrigeration apparatus of the "reach-in" type, taken along line 5—5 of Fig. 6; and Fig. 6 is a cross-sectional view of the device shown in Fig. 5, taken along line 6—6 of the latter figure.

Forced convection refrigeration systems include the usual refrigeration box or cabinet, which is insulated with cork or the like. A cooling unit and fan or blower are provided to circulate air through a heat exchange zone where the food products being refrigerated are stored. While it has been possible to maintain the temperature of the storage zone at a low level it is difficult to provide optimum preservation of food from such standpoints as odor and taste contamination and dehydration. The odor and taste contamination becomes particularly important where a mixture of different kinds of foods is stored. That is, one food will give off odors which are absorbed by another food. An effort has been made to remove the odors by intermittently lowering the temperature of the cooling coil below the freezing point of water so that moisture in the air of the refrigerator will condense on the coil and entrap odors. Thereafter, the resulting ice is melted and the water is drawn off. This odor removal is inefficient and has the disadvantage of dehydrating the air in the refrigerator.

In accordance with the present invention there is provided a system for effective odor removal and at the same time desirable conditions of humidity are provided. As shown in Figs. 1 to 4, the refrigeration system includes an outer box or cabinet 10 which is of standard construction and which has an outer wall 11 and an inner wall 12 between which is provided an insulating material 13 composed of cork or the like. The interior 14 of the cabinet constitutes a storage space in which foods of various types are to be stored. The top of the cabinet may taper, as shown in Fig. 2, and extending longitudinally of the cabinet at the upper portion of the storage chamber is a collection channel 15 forming an initial part of the circulation system. The channel 15 communicates with a downwardly extending flue 16, which preferably is positioned in the central portion of the refrigerator, as will be seen in Fig. 1.

Flue 16 communicates at its lower portion with a blower chamber 17, in which is positioned a suitable fan or blower for circulating air through the refrigerator. The blower may be operated by a motor 18 and draws air from the flue 16 into a lower refrigeration compartment 19. The refrigeration compartment 19 extends transversely of the cabinet and contains a conventional coil member 20 into which refrigeration gases are expanded. Air leaving the blower chamber 17 passes into the refrigeration chamber 19, as indicated by the arrows in Fig. 2, and passes downwardly through the coil 20 in contact with the fin members 21, the latter effecting a heat exchange with the refrigeration gases and cooling the air to the desired temperature. As the air passes through the fin members 21 it is diverted outwardly along the bottom of the cabinet, as shown by the arrows in Fig. 1. The bottom of the refrigerator is provided with a series of transversely extending spaced slats 22, which are supported on longitudinally extending members 23, the latter spacing the slats above the bottom of the cabinet. Air issuing from the refrigeration coil passes upwardly through the slats 22 and into the storage compartment, where it effects a heat exchange with the articles being refrigerated. Thereafter, the air completes its circuit by again passing into the upper channel member 15.

Suspended adjacent the lower portion of the collection channel 15 and positioned in the path of flow of gases are a plurality of foraminous pads 24 containing granular particles of activated carbon as indicated at 25. It is preferred to employ an activated carbon such as the product known as "Darco". In the position indicated the air coming from the food passes directly through the carbon at the point of substantially the highest temperature in the refrigerator. The granular nature of the carbon results in a relatively low pressure differential across the pad and permits free passage of air therethrough without taxing the capacity of the blower by which the air is circulated.

The cooling unit is operated in such a manner that the coil 20 remains at a temperature above the point at which the water vapor in the circulated air will form ice on the cooling coil, and the temperature of the air going to the storage zone is above this point. In this temperature control the coil itself may remain in a permanently damp or wet condition without the usual intermittent formation of ice thereon. If the cooling unit is operated intermittently, it may establish a range of about 33° F. during operation and 37° F. during its off period. The temperature in the storage zone may be of the order of 35° to 40° F.

In the operation of a forced convection refrigeration system the air constituting the medium by which the food is cooled picks up odors from the different types of food and if these odors are recirculated there results a serious contamination which may even render portions of the food unsuitable for consumption. Products such as fish, liver, cheese and the like give off odoriferous gases which contaminate adsorptive foods such as milk and butter. It has been found that a portion of the odoriferous gases given off by the food products may be removed by freezing the moisture out of the circulated air, the odor-imparting substances being entrapped in the resulting ice and being removed from the refrigerator by melting the ice and draining the ice water. This practice has several drawbacks, including dehydration of the food and the tendency of the refrigerator to become sour, due to the presence of water containing dissolved substances subject to souring or molding. Where the coil freezes water from the air in the closed refrigeration system, the air returning to the storage zone in contact with the food has a low humidity and dehydrates the food, thereby destroying its fresh appearance and causing shrinkage of the food. In the present refrigeration system the use of an activated carbon purification unit positioned in the path of travel of air passing from the food to the cooling unit permits of the operation of the cooling coil at a temperature above the freezing point of water with the result that the food in the storage zone is maintained without contamination, and the air in the refrigerator is maintained at a high degree of moisture saturation. The air is conditioned between each contact with the food in the storage zone to remove odors without freezing moisture out of the air and without the formation of a sour water to be drained from the refrigerator. The temperature control and high humidity result in an efficient operation from the standpoint of maintaining the food in good condition. This efficiency is obtained without the use of an unduly large coil surface or an excessive air circulation.

The use of activated carbon positioned in the path of flow of the convection gases, as described, has the further property of preventing the growth of mold-producing fungi caused by spread of spores contained in the circulated air. Saprophytic fungi have a tendency to grow in the solubles-containing water produced in the ordinary refrigerator, thereby contributing to the souring of the refrigerating cabinet. Removal by the carbon of gases upon which the fungi might develop if trapped in water reduces the possibility of growth, and removal of air-borne spores prevents the circulation and distribution of the spores, thereby preventing contamination of the food contained in the storage chamber. In this manner the preservation of the food is improved and the refrigerator is maintained sweet and clean. There is a definite tendency for the coil and other elements of ordinary refrigerators to require an unpleasant sour odor which may be transferred to food products. By removing organic gaseous substances and spores from the air leaving the food prior to contact of this air with the cooling coil, these objections are avoided and the coil may be operated at a temperature particularly effective for food refrigeration purposes above the point at which water freezes out of the circulated air. Thereby, substantially all of the water of the food products and water vapor in the air are preserved without loss. The coil does not freeze water out of the air, and the food products are not dehydrated. The air itself may remain substantially saturated with water vapor and may even add to the fresh appearance of food products in the storage zone.

By operating the cooling coil at a temperature which will not freeze water vapor from the air, there is provided sufficient moisture in the refrigeration system to insure effective action by the activated carbon in removing spores and gaseous products. The coil and carbon have mutually beneficial actions which result in a highly satisfactory refrigeration. Operation of the coil under the conditions described provides for a humidity which continuously may be over 80 per cent and preferably is of the order of 85 to 95 or more. That is, the circulated air is continuously and substantially saturated and this substantially non-dehydrating air results in little, if any, moisture being removed from the food products.

In the embodiment of the invention shown in Figs. 5 and 6, the refrigeration unit is shown as applied to a refrigerator of the "reach-in" type in which the cabinet 30 is provided with one or more doors 31 through which access may be had to food. At the top of the cabinet two activated carbon pads 32 are positioned in angularly disposed complementary position transversely of the cabinet to form a collector channel 33 therebetween. A plate 34 connects the lower edges of the carbon pad to insure passage of all the circulated air therethrough, and at the rear of the cabinet the channel 33 connects with the downwardly extending flue 16 leading to the cooling unit. The large area afforded by the carbon pads positioned in this manner provides a minimum resistance to passage of air and insures effective contact of the air with the carbon. The circulation of air through the carbon is necessary for removal of air-borne spores. The arrangement of the carbon pads at the warmest position in the refrigerator where the circulated air passes through the carbon after contact with food and before contact with the cooling coil and maintenance of a high state of humidity results in effectively preventing fungus growth. Under the conditions specified the carbon is efficacious for extended periods of use before replacement or reactivation.

Numerous changes in the description made herein are possible without departing from the scope of the invention as defined in the appended claims.

I claim:

1. A forced convection refrigeration system including a refrigeration compartment, a collection chamber at the upper portion of said refrigeration compartment, a relatively thin pad of granulated activated carbon forming the passageway between said refrigeration compartment and said collection chamber, said carbon pads extending substantially the length of the collection chamber and forming a partition therefor, a cooling unit communicating with said collection chamber and said refrigeration zone, means for producing forced convection of air through said refrigeration zone, carbon pad, collection chamber, and cooling unit, and means for maintaining said cooling unit at a temperature sufficiently high to prevent water vapor in said air from forming ice on said cooling unit.

2. A forced convection refrigerator, comprising a refrigeration compartment divided into a food refrigerating chamber, a collecting chamber and air conducting means for conducting an air stream from said collecting chamber to said refrigeration chamber, a cooling unit in said air conducting means, a relatively thin pad of granular activated carbon forming a passageway between the refrigerating chamber and the collecting chamber, said carbon pad extending substantially the length of the collecting chamber and forming a partition therefor, and means for circulating air consecutively through said refrigerating chamber, collecting chamber, and conducting means.

3. A refrigerator as defined in claim 2, wherein the activated carbon is obliquely disposed to the walls of the refrigeration compartment.

LYMAN B. BETZ.